June 19, 1951     H. F. KENNISON     2,557,544
METHOD FOR LINING PIPES
Original Filed April 14, 1945     5 Sheets-Sheet 1
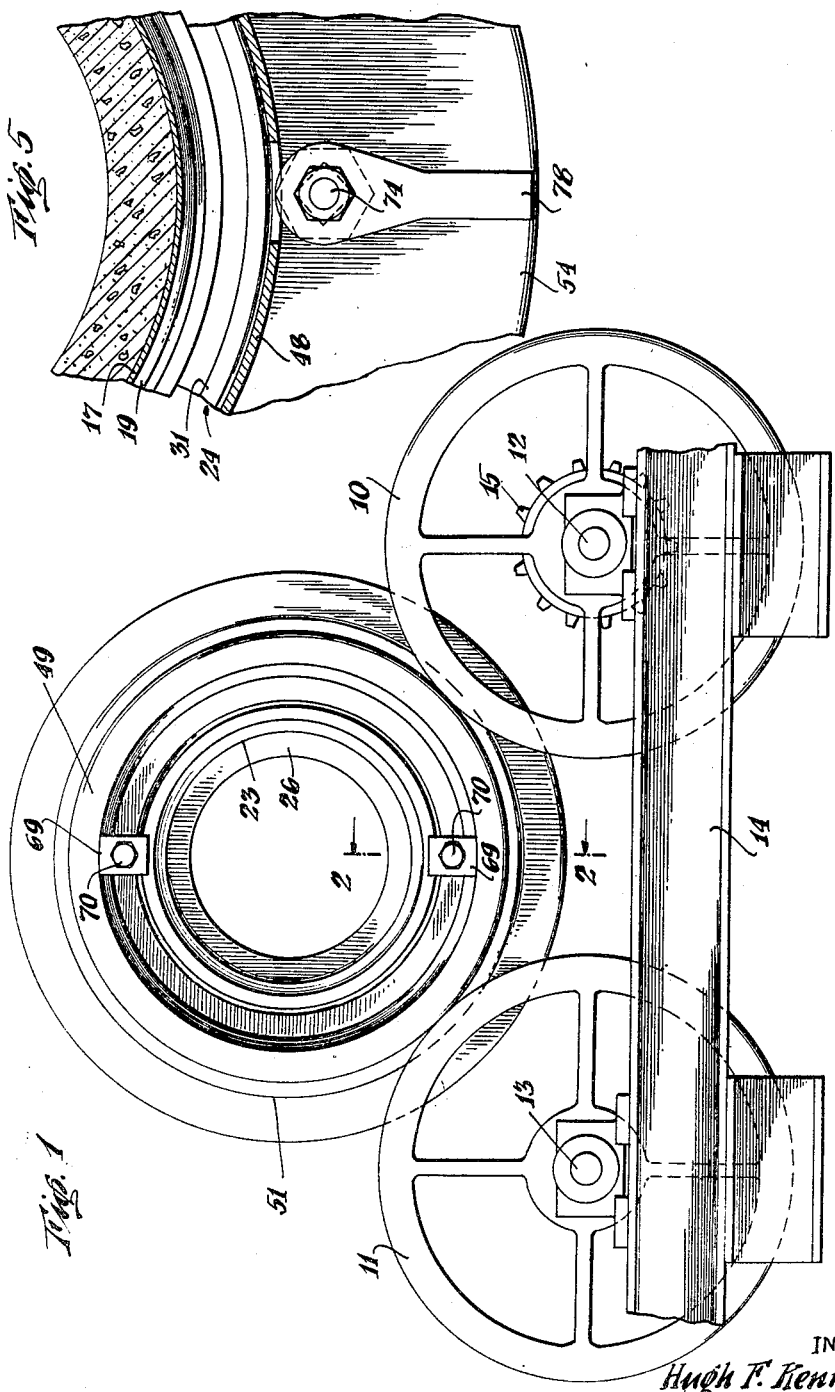
INVENTOR
Hugh F. Kennison
BY
Robert S. Dunham
ATTORNEY

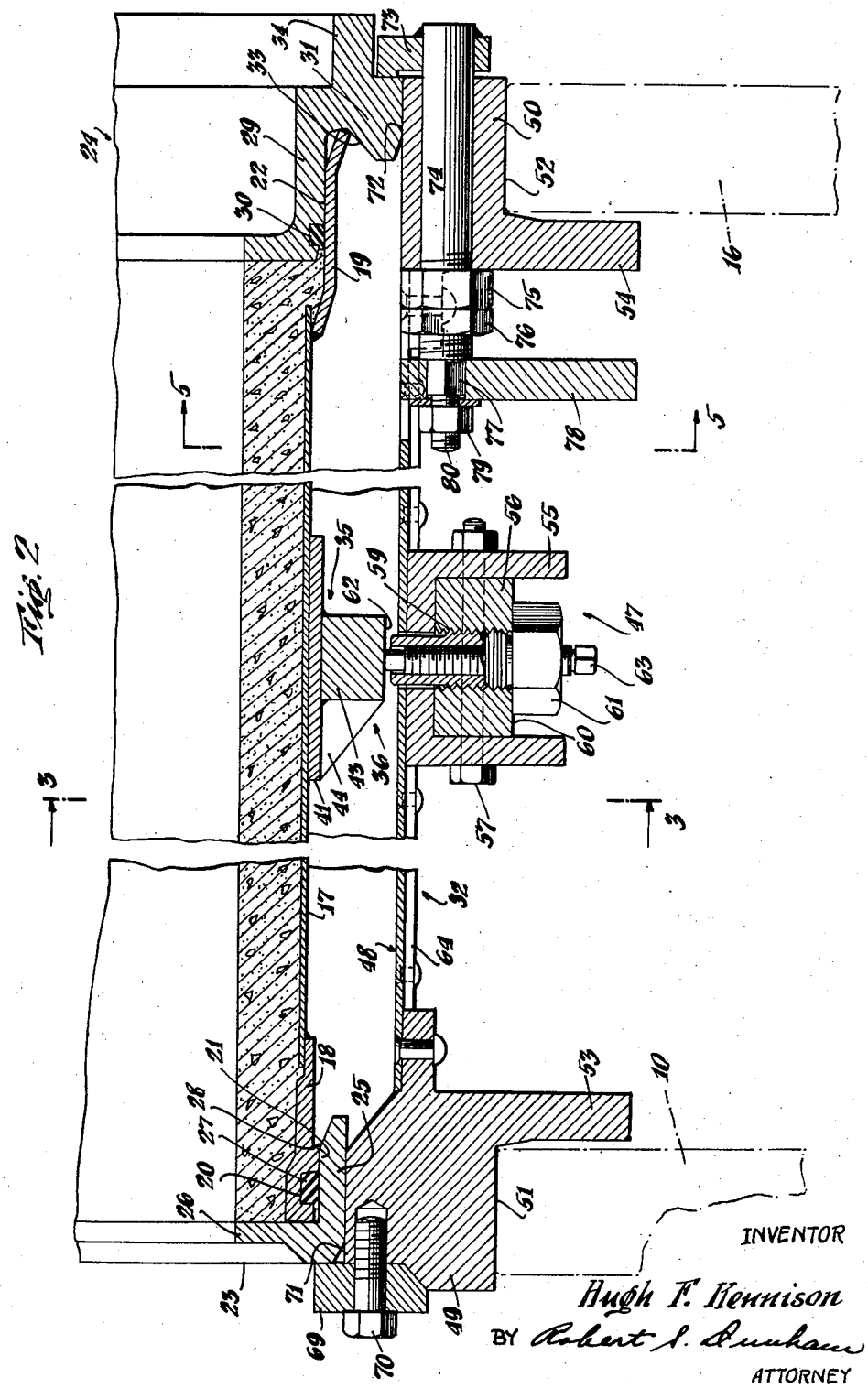

June 19, 1951 — H. F. KENNISON — 2,557,544
METHOD FOR LINING PIPES
Original Filed April 14, 1945 — 5 Sheets-Sheet 3
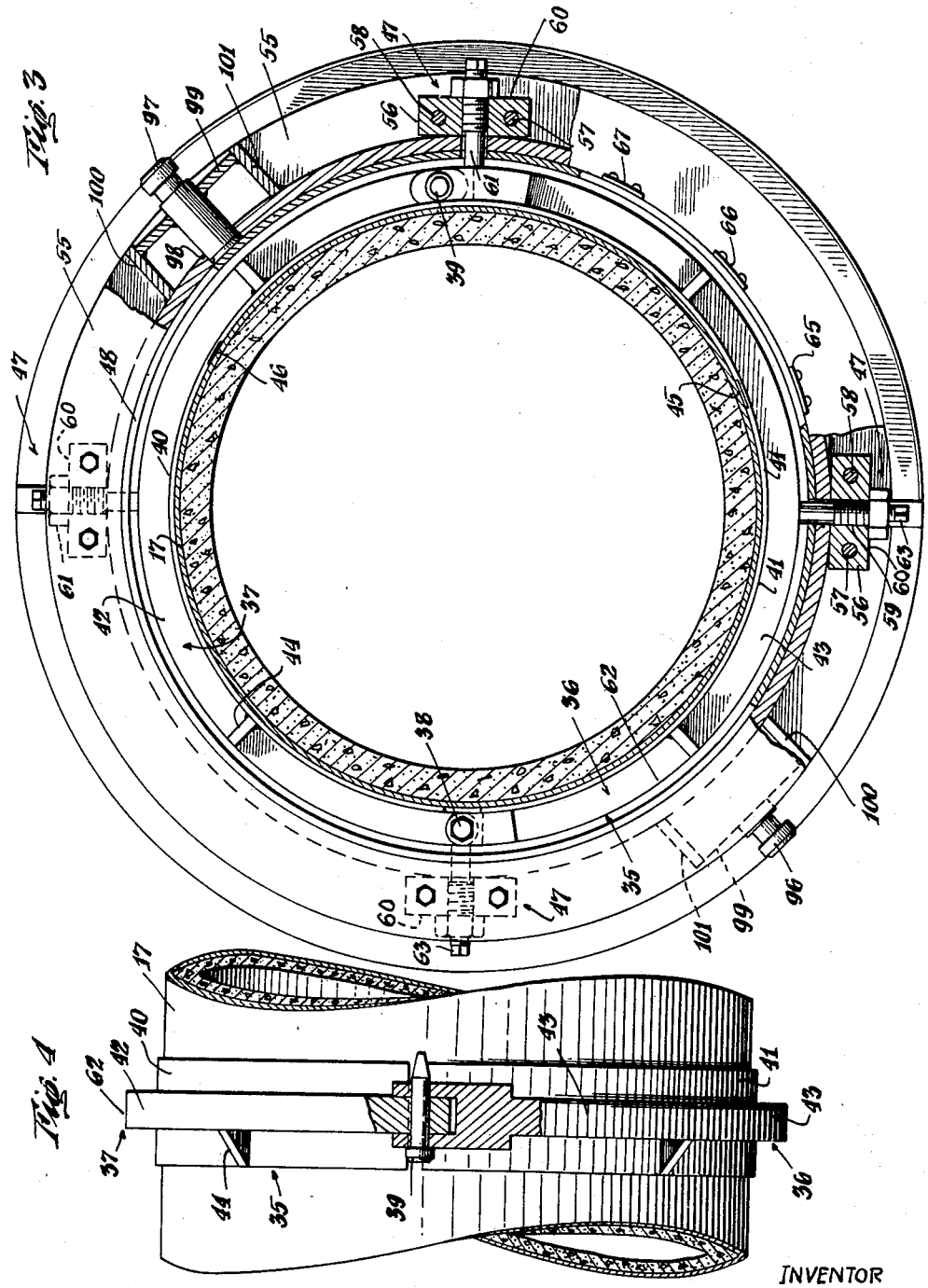
INVENTOR
Hugh F. Kennison
BY
Robert S. Dunham
ATTORNEY

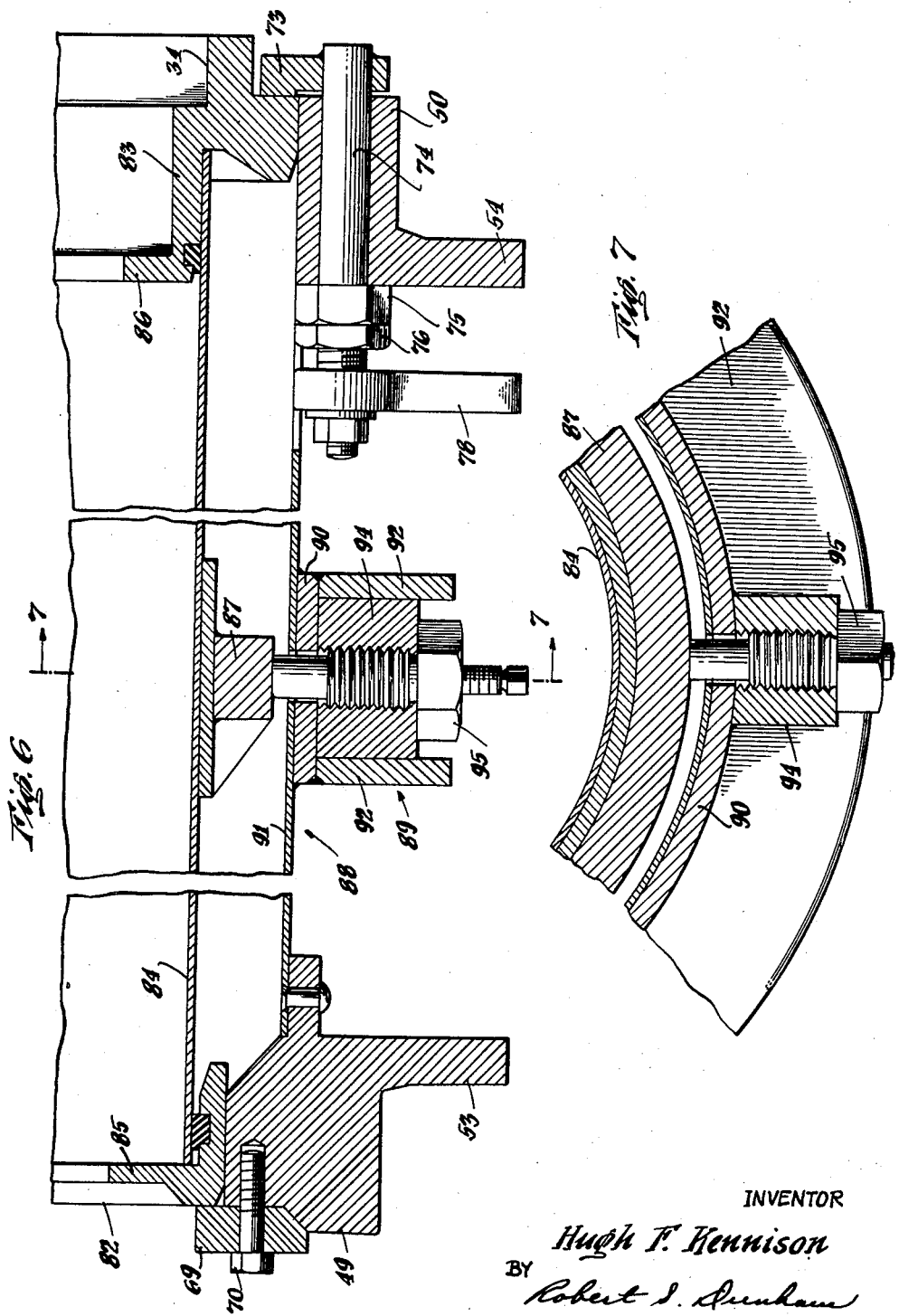

June 19, 1951 H. F. KENNISON 2,557,544
METHOD FOR LINING PIPES
Original Filed April 14, 1945 5 Sheets-Sheet 5
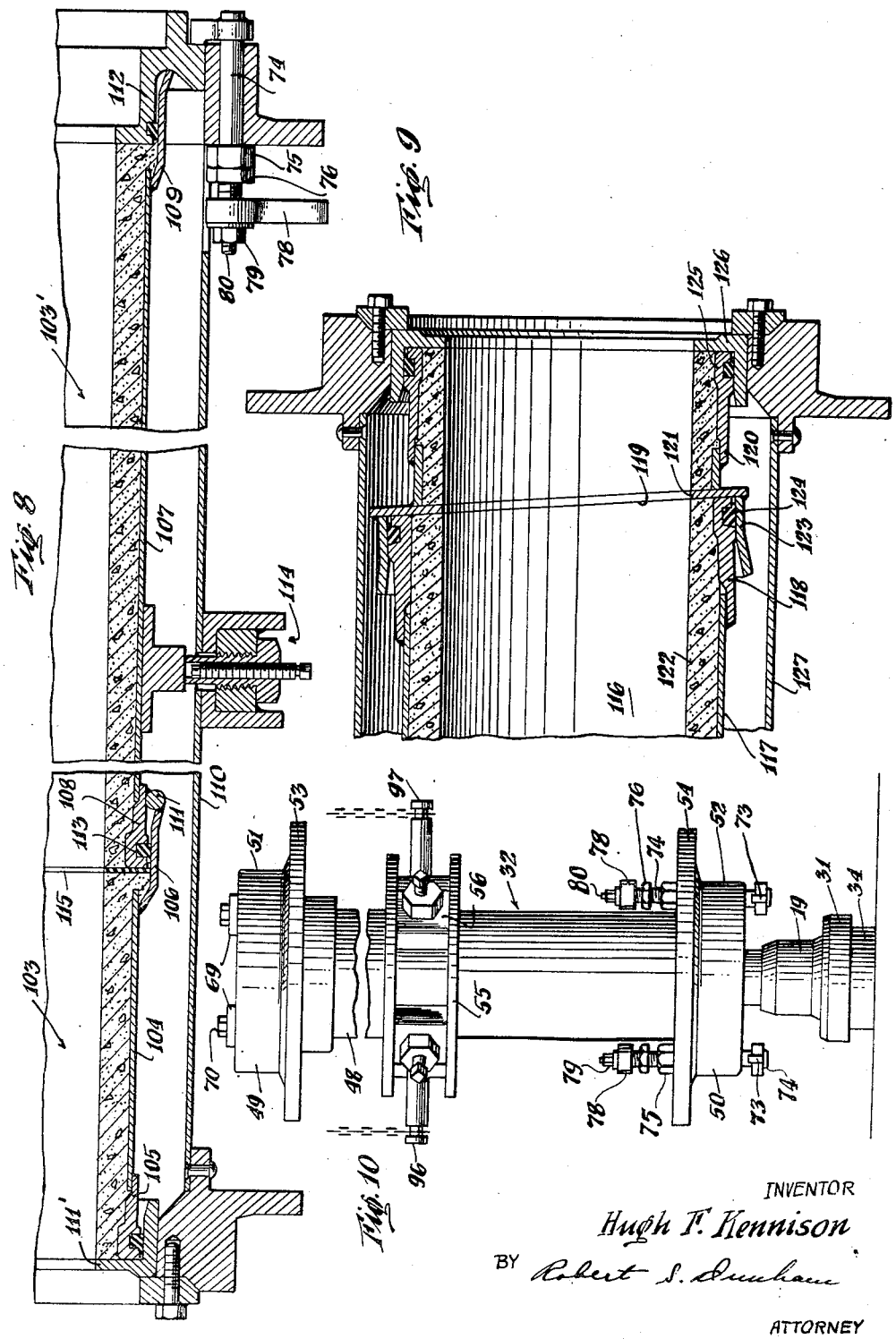
INVENTOR
Hugh F. Kennison
BY Robert S. Dunham
ATTORNEY Patented June 19, 1951

2,557,544

UNITED STATES PATENT OFFICE 2,557,544

METHOD FOR LINING PIPE

Hugh F. Kennison, Verona, N. J., assignor to Lock Joint Pipe Company, East Orange, N. J., a corporation of New Jersey Original application April 14, 1945, Serial No. 588,316. Divided and this application November 12, 1947, Serial No. 785,356

2 Claims. (Cl. 25—154)

This invention relates to a method for applying a lining of cementitious or other plastic material to a hollow cylinder or pipe by centrifugal action.

The method of this invention is particularly suitable for lining a cylindrical metallic shell or hollow cylinder of a type which is commonly employed within the wall of a high pressure concrete pipe, although it is applicable to other fields of use which involve the application of a lining by centrifugal action. For nearly all of the molding operations required to produce the pipe sections needed for a particular pipe line it is necessary to have available molding apparatus capable of forming pipe sections of a given or standard length, but when a condition arises which demands the use of a pipe section having a length less than that which is moldable in the available apparatus, resort must be had to other procedure for producing the required pipe section. It would be an economic waste to provide additional apparatus for each job for molding pipe sections of special lengths because of the increased costs that would be entailed and the fact that the apparatus for molding pipe sections of odd lengths would be idle most of the time. Furthermore, the constructing problem would not necessarily be solved because need may still arise for a particular length of pipe section for which molding apparatus is not available. It is therefore among the objects of the invention to provide a method for lining hollow cylinders having short or under-standard lengths in a centrifuging molding apparatus capable of lining cylinders of a given or standard length.

Apparatus which is used for applying a lining to the interior of a hollow cylinder is usually provided with a jacket or casing which firmly supports the cylinder to be lined during rotation. The length of a cylinder for which the apparatus is constructed is of a length consonant with the length of the centrifuging jacket or casing. A lined cylinder has a length corresponding to the length of a finished pipe section.

In accordance with the invention, a hollow cylinder or pipe is temporarily joined in axial alignment with spacing means which are of such length as to form with the cylinder a predetermined length consonant with the length of the jacket of a centrifuging apparatus. Dams are located adjacent to the respective ends of the cylinder to limit the axial extent of the flow of cementitious material during the distribution thereof. The hollow cylinder and joined spacing means are mounted within the centrifuging jacket and firmly secured therein. The cementitious material is supplied to the interior of the hollow cylinder to be lined, and the jacket and the contained cylinder are rotated to distribute the cementitious material uniformly against the wall of the cylinder by centrifugal action. When the cementitious material has set, the hollow cylinder and attached spacing means are removed from the jacket and the hollow cylinder is then disconnected from the spacing means which were employed to support and position the hollow cylinder within the jacket.

The spacing means may constitute a second length of a short pipe section, which has previously been lined by hand or by some other method, and which serves the purpose of a dummy form, or may constitute a short length of pipe or hollow cylinder which can be lined at the same time, it being understood that the total length of a pipe or hollow cylinder to be lined and the spacing means is such as may be accommodated within the jacket of the molding apparatus which is available.

The same principle is also useful for lining truncated cylinders having one or both ends bevelled, and which are used for making deflections in the alignment of a pipe line consisting of a series of connected pipe sections. In practicing the invention for accomplishing this purpose, the spacing means which is attached to the cylinder to be lined is bevelled at its attached end at an angle complementary to the bevel of the end of the cylinder to be lined to which it is temporarily attached, so that the cylinder to be lined and the spacing means are in axial alignment. If both ends of the cylinder are bevelled, then other spacing means are employed which terminate at one end in a manner complementary to the end of the hollow cylinder to which said other spacing means is attached, the total length of the cylinder and the spacing means being consonant with the length of the jacket within which they are mounted.

A centrifuging apparatus, by which the method of the present invention may be practiced, is described and claimed in the United States Patent No. 2,486,420, granted November 1, 1949, of which the present application is a division. It is apparent, however, that other suitable apparatus having a rotatable jacket or casing may be employed for practicing the present invention.

The accompanying drawings illustrate a centrifuging apparatus with which the present invention may be practiced, Fig. 1 showing an end view of the apparatus;

Fig. 2 is a longitudinal section on a vertical plane through the lower portion of a centrifuging jacket and contained cylinder;

Fig. 3 is a vertical section of the jacket on line 3—3 of Fig. 2;

Fig. 4 is an edge view of a girth ring;

Fig. 5 is a section on line 5—5 of Fig. 2;

Fig. 6 is a vertical longitudinal section of a centrifuging jacket modified to accommodate a straight-walled cylinder;

Fig. 7 is a section on line 7—7 of Fig. 6;

Fig. 8 is a longitudinal section similar to Fig. 2 and showing the manner of lining short lengths of pipes;

Fig. 9 is a longitudinal section through one end of a centrifuging jacket and illustrating the manner of lining bevelled pipe;

Fig. 10 illustrates the removal of the jacket from a lined pipe.

In the apparatus illustrated in the drawings, the centrifuging jacket is mounted upon two pairs of rollers which are driven to cause the rotation of the jacket. Two of the rollers 10 and 11 are shown in Fig. 1 and a similar pair of rollers is located adjacent the other end of the centrifuging jacket. These rollers are mounted on shafts 12, 13 which are carried in bearings supported by a frame 14. The locations of the longitudinally separated pairs of rollers are indicated at 10 and 16 in Fig. 2. At least one of the rollers is driven by a motor through a sprocket wheel 15, Fig. 1.

The apparatus is particularly suited for applying a lining of concrete or of other cementitious material to the interior of a steel cylinder or tubular shell of a pipe. As shown in Figs. 2 and 3, the wall to be lined is a steel sleeve 17 to which joint rings 18 and 19 are welded entirely around their circumferences. The sleeve is formed by a rolled plate with longitudinal edges welded together. In the particular pipe illustrated, the joint ring 18 forms the spigot end of the pipe and is provided with a gasket-receiving recess 20. The joint ring 19 is in such a form as to provide the bell at the other end of the pipe. These joint rings are made of steel and their bearing surfaces 21 and 22 are cylindrically trued to engage corresponding bearing surfaces of similar pipes. The product of the apparatus may be a completed pipe or a lined sleeve to be used in the manufacture of a prestressed reinforced concerte pipe of the character described in United States Patent 2,348,765. So far as some aspects of the present invention are concerned it is immaterial whether or not the cylinder to be lined is of one piece or has bell and spigot rings attached to a cylinder.

For fitting the steel cylinder of the pipe onto the apparatus, a pair of end rings 23 and 24 are provided. End ring 23 has an axially extending flange 25 and a radially extending portion 26 which, respectively, engage the bearing surface 21 of the spigot ring and the end of the spigot ring, Fig. 2. Flange 25 is sufficiently long to extend beyond a rubber gasket 27 by which a seal is produced between the steel shell of the pipe and the end ring. Flange 25 is tapered at its free edge 28 to force gasket 27 into its receiving groove 20 when the ring is being applied over the end of the spigot ring.

Ring 24 has an axially extending portion 29 providing a circular surface which fits within the interior bearing surface 22 of the bell ring 19. End ring 24 is provided with a gasket-receiving recess 30 which accommodates a rubber gasket for sealing between the bell ring 19 and the end ring 24. End ring 24 has an outwardly-extending portion 31 by which the pipe and the end ring are supported in the jacket 32 of the apparatus. Portion 31 of the end ring is provided with a re-entrant surface 33 against which the end of the bell ring 19 abuts. The end ring also is provided with an axially-extending flange 34 which terminates beyond the right end of the jacket 32 and its associated parts, Fig. 2. The portion 34 serves as a base for supporting the pipe and jacket when they have been removed from the rollers and are stood on end, as will be explained hereinafter.

In order rigidly to support the wall of the cylinder during centrifuging and to correct for any irregularities between the concentricity of the cylinder and the jacket, I employ encircling bands or girth rings which are placed about the cylinder before the cylinder is placed in the jacket. One of these girth rings 35 is shown in Figs. 2, 3 and 4. When the cylinder is comparatively thin, or the length of the cylinder is several times its diameter, it is of advantage to have more than one girth ring in spaced relationship longitudinally thereof.

Some prestressed concrete pipes employ a cylinder or sleeve within the wall of the pipe which is formed from relatively thin sheet steel, say, of a thickness of about 18 gauge. Sometimes the cylinder is not truly round throughout its length and sometimes the cylinder may be bowed lengthwise so that all portions are not concentric crosswise of the cylinder. One purpose of the invention is to eliminate such irregularities before a concrete lining is placed so that when the concrete hardens the pipe will be symmetrical and correctly formed.

Whatever correction may be necessary is obtained either through the constraining effect of the girth ring on the cylinder or by adjusting the girth ring and embraced cylinder radially of the true axis of the shell by the cooperative influence of the jacket on the girth ring. The band of each girth ring has a predetermined radial thickness determined by concentric and circularly true inner and outer surfaces, the diameter of its inner surface corresponding to the outer diameter of the cylinder, and the diameter of its outer surface being such as to cooperate with displaceable engaging devices carried by jacket 32, which, when adjusted, place and hold the girth ring and its embraced portion of the cylinder concentric of the true axis of the cylinder and rotary portions of the apparatus. The girth ring is best seen in Figs. 3 and 4.

Each girth ring consists of two semi-circular parts 36 and 37 which are pinned together by a bolt 38 and by a removable pin 39. The bolt and pin pass through holes at the respective ends of the semi-circular parts 36 and 37. Pin 39 is tapered at one end to facilitate its engagement when the girth ring is being placed about the shell. While the girth ring may be variously formed, I prefer to employ bands of metal 40 and 41 which are rolled into semi-circular shape and to which are attached heavy bars 42, 43, which are similarly rolled. Each bar is joined to its associated band by welded connections. The inside diameter of the girth ring is machined cylindrically true to correspond with the exterior diameter of the cylindrical shell 17 of the pipe. The inside surfaces of the bands 40, 41 may be notched with shallow grooves, such as at 45, 46, to straddle longitudinal welds in the wall of the cylinder. The girth ring is provided with pilots 44 in the form of plates, each having a sloping edge to prevent the jacket from catching on the girth ring as the jacket is lowered over the cylinder and girth ring during assembly. It will be understood that the girth rings are so placed upon the pipe as to be located opposite from the engaging devices 47 which are mounted upon jacket 32 and which will be described hereinafter.

The jacket includes a sleeve 48 which is secured at its ends to runner rings 49 and 50. Each runner ring has a true cylindrical surface 51, 52, which engages with the rollers of the apparatus whereby the jacket and its contained pipe are rotated. Flanges 53 and 54 on the respective rings 49 and 50 face the inside surfaces of the rollers as illustrated in Fig. 2.

The engaging devices 47 of each set of engaging devices are spaced circumferentially around the jacket in a diametrical plane. When an odd number of girth rings are employed a ring of engaging devices would be located at or near the mid-length of the jacket. While the sleeve of the jacket may be variously formed and made sufficiently rigid, it is preferable to employ stiffening means for supporting each set of engaging devices. For stiffening purposes a ring can be welded or riveted to the sleeve. The stiffener ring 55 shown in Fig. 2 consists of a cast channel member.

Four engaging devices are illustrated in Fig. 3. Each of these engaging devices includes a block 56 which is fastened to and between the flanges of the channel member 55 by means of bolts 57 and 58. The block 56 is provided with a tapped hole 59 for receiving the stem of a cap screw 61 which extends inwardly of the jacket through a drilled hole in the web of the channel member and the sleeve 48 when a cylinder has been mounted in the jacket.

The outer surfaces 60 and all of the blocks 56 are located at the same distance from the axis of the jacket and runner rings and the length of cap screws 61 is such as to locate an engaged girth ring concentric to that axis when the caps of all of the screws are seated against the blocks. However, when the cylinder 17 and the surface 62 of the girth ring are eccentric with respect to the jacket, the stem of screw 61 at one side of the shell will be short of the surface 62 of the girth ring when the screw is seated against block 56. If further tightening of all of the screws 61 does not fully correct the eccentricity, the set screw 63 of any non-touching cap screw is advanced into contact with the girth ring whereby the cylinder is supported at diametrically opposite points. The cylinder is thereby held securely by each girth ring regardless of its possible lack of true concentricity. The functioning of a set screw 63 in this manner is illustrated in Fig. 2.

In the event that the sleeve 48 of the jacket is made of relatively light material, it is desirable that it be stiffened so that the stiffener ring 55 will be rigidly supported. The sleeve may be stiffened by attaching thereto a plurality of strips of metal such as 64, 65, 66, 67, etc., circumferentially spaced therearound. Inasmuch as the principal function of the jacket is to connect the runner rings and provide rigidity for the stiffener ring, it is apparent that sleeve 48 may be formed as an open frame with bars extending between and connecting the runner rings.

It will be noted that the inner diameter of runner ring 50 is such as to accommodate the passage of the pipe and its associated girth ring 35 when the shell of the pipe is being placed within the jacket. When within the jacket, spigot ring 18 abuts end ring 23 which bears against a plurality of dogs 69 spaced around and fastened to runner ring 49 by cap screws 70. It is important that the pipe and associated rings be held firmly in position within jacket 32 and to assure this the bearing surfaces 71 and 72 between the respective rings at the ends of the apparatus may be machined if necessary to provide a close sliding fit. In order to prevent axial displacement of the pipe relative to the jacket a plurality of dogs 73, one of which is shown in Fig. 2, are brought to bear against the radial surface of end ring 24. Each of these dogs 73 is fixedly secured to the end of a threaded rod 74 which is carried by runner ring 50. A nut 75 engages the thread of the rod and draws the dog 73 into tight engagement ring 24 and the tightened position of nut 75 is maintained by a lock nut 76.

The free end of rod 74 is provided with flat surfaces 77 beyond the threads which are engaged by nuts 75 and 76. Each finger member 78 is holed for the purpose of engaging the flat surfaces 77 and the finger 78 is thereby held from rotation with respect to its supporting rod. The relation of finger 78 to rod 74 is such that the rod will extend radially from the axis of the casing when dog 73 is in engagement with the ring 24, as shown in Fig. 2. Finger 78 is held in place by a nut 79 which is fastened to a reduced threaded portion 80 of rod 74. The purpose of finger 78 is to provide a weighted member which assures that dog 73 can not turn during centrifuging action in the event that the nuts 75 and 76 become loose. The disposition of the weight of finger 78 is such that the centrifugal action thereon will cause dog 73 to remain engaged with ring 24 even though nut 75 becomes loose.

In the modification of the invention illustrated in Figs. 6 and 7, the demountable end rings 82 and 83 are so formed as to accommodate and seal the ends of a hollow cylinder or tube 84 which has a uniform cross-section throughout its length. The inwardly extending legs 85 and 86 of the end rings 82 and 83, respectively, determine the longitudinal dimension of the lining which may be as thick as the radial height of the legs. Girth rings 87 are employed as necessary. The jacket may be constructed as previously described. The stiffening means 89 is formed from a band of steel 90 which engages and is fastened to the exterior of the jacket. Stiffening rings are built up by attaching to the band 90 a pair of radially-extending rings 92 which are welded to the band 90. The blocks 94 of the engaging devices are welded in place and circumferentially distributed about the jacket. The screw 95, which engages the girth band, is shown in Figs. 6 and 7 as in normal contact with the girth band, that is, with its stem engaging the girth band and the cap of the screw seated against the block.

Following a centrifuging operation the jacket and its contained pipe may be lifted from the rollers by a hoist having a bridle with chains and hooks for engaging trunnion pins 96 and 97, Figs. 3 and 10, which are mounted on and secured to diametrically opposite locations on the stiffener ring of the jacket which is in mid-position along the length of the jacket. The inner end of each trunnion pin 96, 97 is mounted in a hole 98 which is drilled in the web of channel member 55, Fig. 3. A plate 99 likewise is drilled for the passage of the trunnion pin and this plate is fastened to the flanges of the channel member 55 at opposite sides of the plate. Other sides of plate 99 are fastened to plates 100 and 101 which extend between the flanges of channel member 55 and together with the flanges of channel member 55 form a box for supporting the trunnion pin. The trunnion pin is welded in place and the plates forming the box-like enclosure are welded to each other and to the channel member.

When the jacket and enclosed cylinder are lifted from the rollers of the apparatus they are carried to one side and the jacket is turned on its trunnion pins into a vertical position and set upon the ground with end ring 24, Fig. 2, or 83, Fig. 6, lowermost. The jacket is turned more easily if the trunnions are located a slight distance from the center of gravity. In this position the base 34 of the end ring supports the entire assembly clear of the ground.

It then is possible to loosen dogs 73 and turn them sufficiently to clear the periphery of the end ring. After the engaging devices 47 have been released from engagement with the girth ring, the jacket can be lifted from the pipe which will remain in a vertical position, as supported by the lower end ring. The pipe may be left in this position while the concrete lining cures and the jacket of the apparatus is immediately available for another centrifuging operation, it being necessary only to have additional end rings, such as 24 and 83, available for this purpose.

Centrifuging apparatus is usually designed for lining pipe sections of a given length and diameter, so that all of the pipe sections which are lined in the apparatus have such dimensions as to conform to a given standard of pipe. It frequently is desirable to produce lengths of pipe shorter than the standard of length of pipe normally used in a given pipe line, and this can be accomplished with the method of the present invention. Assuming that the apparatus is proportioned for producing sections of pipe 16 feet long, two sections, say one 10 feet long and one 6 feet long may be lined during one centrifuging operation. The manner of doing this is illustrated in Fig. 8, in which is shown two lengths of short pipe 103 and 103'. Section 103 includes a steel sleeve 104 and spigot and bell rings 105 and 106, respectively. Section 103' includes a steel cylinder formed of a sleeve 107 and attached spigot ring 108 and bell ring 109. Before these sections are introduced within the jacket 110, they are joined by joining ring 111 which is temporarily connected by welding to the spigot 108 and bell 106 of the joined pipe sections. As joined, the two sections have a length which corresponds to the standard length of pipe sections for which the apparatus is designed.

The joined sections are introduced within the jacket with their ends supported by demountable end rings 111', 112 of the apparatus. The ends of the joined section are sealed by gaskets in the manner previously described and a gasket 113 is also employed between the two joined sections. Any irregularity in the eccentricity of the joined sections is corrected by means of the engaging devices 114. After the screws of these engaging devices have been properly adjusted, the joined sections will be rigidly held against displacement during their rotation. In order to provide a separation between the linings of the two sections, a thin gasket 115 is placed against the end of spigot ring 108. This gasket may be made of rubber or composition material suitable for its function. The lining may be applied by rotating the jacket and contained sections, while at the same time introducing plastic cementitious material within the sections and in sufficient amount to produce the desired wall thickness.

It is also apparent that if short sections of one length only are desired, one or the other of the short sections may constitute a dummy which already has a previously-applied lining. In this case the plastic material would be introduced only within the section of pipe which is to be lined. After the centrifuging operation is accomplished, the joined pipe sections are removed from the jacket in the manner previously described and they are disconnected by removing the temporary joining ring 111.

In Fig. 9 I have illustrated the manner of lining sections of pipes having bevelled ends. One end of such a section is shown at 116. A shell 117 is connected to a spigot ring 118 which terminates at 119 in a plane which is bevelled with respect to the axis of the section. This end of the bevelled section is supported by a dummy section 120 carrying an apertured ring 121 which is parallel to the terminal end 119 of the spigot ring. This annular ring forms a wall at the bevelled end of section 116 and the aperture therein determines the thickness of the lining material 122 which is to be applied to the bevelled section. The spigot and bell rings 118 and 123 are joined and sealed by a gasket 124 in the usual manner. Section 120 has a square end provided with a spigot ring 125 which is sealed against and supported by a demountable end ring 126 of the centrifuging apparatus. The dummy section 120 may be lined or not. Section 116 is lined by introducing plastic material to the interior thereof during the rotation of the jacket 127. The bell end of section 116 may be square and supported in the jacket as shown at the right end of Fig. 8. If bevelled, a dummy section similar to 120, but with a bevelled spigot ring in place of the bell ring, may be used.

For the purpose of describing my invention I have illustrated in the drawings pipes having spigot and bell ends, but it is to be understood that the invention is susceptible of use for making double spigot pipes and double bell pipes. Reference is, therefore, to be had to the appended claims for a definition of the limits of the invention.

What is claimed is:

1. A method for lining a hollow cylinder with a flowable cementitious or other plastic material wherein the cylinder is to be rotated about its axis within a jacket during the setting of the material and wherein the cylinder to be lined is of substantially less axial extent than said jacket, comprising the steps of attaching the cylinder to be lined in axial alignment with spacing means which are of such length as to form with said cylinder a predetermined length consonant with the length of said jacket, locating dams adjacent to the respective ends of said cylinder to limit the axial extent of flow of the plastic material during the distribution thereof, securing said cylinder and said spacing means within said jacket and concentric therewith, supplying plastic material to the interior of the cylinder to be lined, and rotating said jacket and contained cylinder and spacing means to distribute said plastic material uniformly within said cylinder by centrifugal action and during the setting of the plastic material.

2. A method for lining a hollow cylinder with a flowable cementitious or other plastic material wherein the cylinder is to be rotated about its axis within a jacket during the setting of the material and wherein the cylinder to be lined is of substantially less axial extent than said jacket, comprising the steps of attaching one end of a cylinder to be lined to an end of a cylindrical body, mounting said attached cylinder and cylindrical body within a rotatable jacket and concentric therewith, introducing plastic material to the interior of the cylinder to be lined, and rotating said jacket and contained cylinder and cylindrical body.

HUGH F. KENNISON.

REFERENCES CITED

The following references are of record in the file of this patent:

UNITED STATES PATENTS

| Number | Name | Date |
|---|---|---|
| 1,223,602 | Moir et al. | Apr. 24, 1917 |
| 1,573,568 | Nichols | Feb. 16, 1926 |
| 1,672,941 | Hume | June 12, 1928 |
| 2,108,371 | French | Feb. 15, 1938 |
| 2,189,071 | Kopp | Feb. 6, 1940 |
| 2,295,155 | Brown et al. | Sept. 8, 1942 |

FOREIGN PATENTS

| Number | Country | Date |
|---|---|---|
| 145,346 | Great Britain | July 2, 1920 |
| 417,047 | Great Britain | Sept. 17, 1934 |